US011977833B2

(12) United States Patent
Hasan

(10) Patent No.: US 11,977,833 B2
(45) Date of Patent: May 7, 2024

(54) COMPUTER-IMPLEMENTED METHOD AND APPARATUS FOR AUTOMATICALLY ANNOTATING COLUMNS OF A TABLE WITH SEMANTIC TYPES

(71) Applicant: Siemens Aktiengesellschaft, Munich (DE)

(72) Inventor: Rakebul Hasan, Munich (DE)

(73) Assignee: Siemens Aktiengesellschaft, Munich (DE)

(*) Notice: Subject to any disclaimer, the term of this patent is extended or adjusted under 35 U.S.C. 154(b) by 323 days.

(21) Appl. No.: 17/350,330

(22) Filed: Jun. 17, 2021

(65) Prior Publication Data
US 2021/0406452 A1    Dec. 30, 2021

(30) Foreign Application Priority Data
Jun. 30, 2020    (EP) .................................. 20183087.4

(51) Int. Cl.
*G06F 40/169*    (2020.01)
*G06F 16/25*    (2019.01)
(Continued)

(52) U.S. Cl.
CPC .......... *G06F 40/169* (2020.01); *G06F 16/254* (2019.01); *G06F 40/177* (2020.01); *G06N 3/08* (2013.01); *G06N 5/02* (2013.01)

(58) Field of Classification Search
CPC .... G06F 40/169; G06F 16/254; G06F 40/177; G06N 3/08; G06N 5/02; G06N 3/044; G06N 3/045; G06N 5/022
See application file for complete search history.

(56) References Cited

U.S. PATENT DOCUMENTS 11,238,084 B1 *   2/2022   Newman ................ G06F 16/284
2018/0336183 A1 *  11/2018   Lee ........................ G06N 5/022
(Continued)

OTHER PUBLICATIONS

Hulsebos, M., Hu, K., Bakker, M., Zgraggen, E., Satyanarayan, A., Kraska, T., . . . & Hidalgo, C. (Jul. 2019). Sherlock: A deep learning approach to semantic data type detection. In Proceedings of the 25th ACM SIGKDD International Conference on Knowledge Discovery & Data Mining (pp. 1500-1508). (Year: 2019).*
(Continued)

*Primary Examiner* — Daniel C Washburn
*Assistant Examiner* — Athar N Pasha
(74) *Attorney, Agent, or Firm* — Schmeiser, Olsen & Watts, LLP

(57) ABSTRACT

Provided is a computer-implemented method for generating automatically annotations for tabular cell data of a table having column and rows, wherein the method includes: supplying raw cell data of cells of a row of the table as input to an embedding layer of a semantic type annotation neural network which transforms the received raw cell data of the cells of the supplied row into cell embedding vectors; processing the cell embedding vectors to calculate attentions among the cells of the respective row of the table encoding a context within the row output as cell context vectors; and processing the cell context vectors generated by the self-attention layer by a classification layer of the semantic type annotation neural network to predict semantic column type annotations and/or to predict relations between semantic column type annotations for the columns of the table.

15 Claims, 2 Drawing Sheets

(51) Int. Cl.
*G06F 40/177* (2020.01)
*G06N 3/08* (2023.01)
*G06N 5/02* (2023.01)

(56) References Cited

U.S. PATENT DOCUMENTS

| | | |
|---|---|---|
| 2019/0266240 A1* | 8/2019 | Georges .............. G10L 15/1822 |
| 2020/0076841 A1 | 3/2020 | Hajimirsadeghi et al. |
| 2020/0175015 A1 | 6/2020 | Al Hasan et al. |
| 2020/0356729 A1* | 11/2020 | Duan ........................ G06N 3/08 |
| 2021/0165960 A1* | 6/2021 | Eisenschlos .......... G06F 40/284 |
| 2021/0382944 A1* | 12/2021 | Li ........................... G06F 16/35 |
| 2022/0405639 A1* | 12/2022 | Nishida .................. G06N 3/096 |

OTHER PUBLICATIONS

Hulsebos, Madelon, et al. "Sherlock: A deep learning approach to semantic data type detection" Proceedings of the 25th ACM SIGKDD International Conference on Knowledge Discovery & Data Mining, 2019.

Zhang, Dan, et al. "Sato: Contextual Semantic Type Detection in Tables" arXiv preprint 1911.06311, 2019.

Vaswani A. et al.: "Attention Is All You Need", 31st Conference on Neural Information Processing Systems (NIPS 2017), Long Beach, CA, USA.

Heinzerling et al.: "BPEmb: Tokenization-free Pre-trained Subword Embeddings in 275 Languages", arXiv:1710.02187v1, Oct. 5, 2017.

* cited by examiner

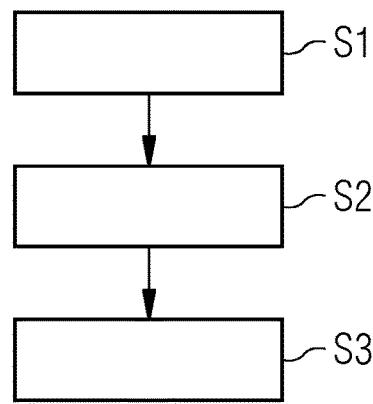
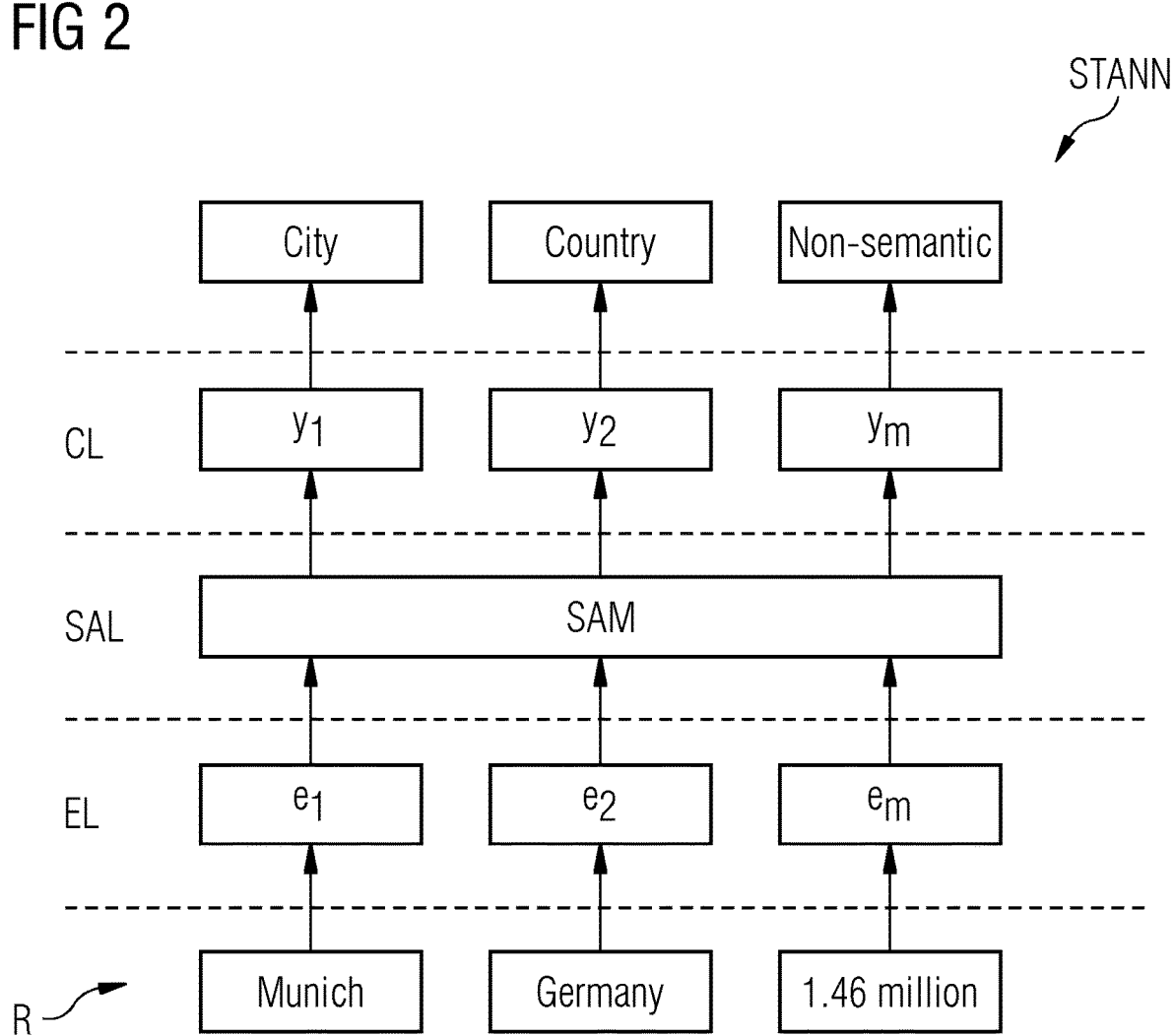

COMPUTER-IMPLEMENTED METHOD AND APPARATUS FOR AUTOMATICALLY ANNOTATING COLUMNS OF A TABLE WITH SEMANTIC TYPES

CROSS-REFERENCE TO RELATED APPLICATIONS

This application claims priority to EP Application No. 20183087.4, having a filing date of Jun. 30, 2020, the entire contents of which are hereby incorporated by reference.

FIELD OF TECHNOLOGY

The following relates to a computer-implemented method for generating automatically annotations for tabular cell data of a table consisting of columns and rows, in particular to perform context-aware semantic annotation for tabular data using self-attention.

BACKGROUND

Tables comprise collections of related data entities organized in rows. A table T comprises several columns C and rows R. A table consists of a plurality of cell data organized in cells and rows of the table T. A detection of a semantic type of data columns in relational tables is necessary for various data preparation and information retrieval tasks such as schema matching, data discovery, semantic search or data cleaning. Further, recognizing the semantic types of table data is requested to aggregate information from multiple different tabular data sources or tables.

The mapping of tabular data of tables T can be categorized into two main categories, i.e. ontology alignment approaches and machine learning approaches. An ontology alignment approach does align a table schema to a target ontology. Machine learning approaches are provided to predict column annotations.

Ontology alignment approaches may first automatically generate a putative ontology from the table schema. This generation process can be based on manually curated rules. A putative ontology is then augmented and refined based on the instance data in the respective table. For example, entropy-based rules can be used in order to discard or keep classes and properties from the initial putative ontology. A further step in the ontology alignment approach is to find alignments between the putative ontology and the target ontology. For the ontology alignment approach, it is possible to use syntactic, semantic or structural similarity metrics to find similarity between the elements of two ontologies. A final step in the ontology alignment approach is to generate declarative mapping definitions from the estimated alignments in a conventional standard format such as R2RML. These declarative mappings can be used both to transform and materialize the tabular source data to a knowledge graph or to query the tabular source data using a target ontology.

Among the conventional machine learning-based approaches to predict column annotations, it is possible to treat the semantic type detection problem as a multi-class classification problem using a feedforward deep neural network. For instance, Hulsebos, Madelon, et al. "Sherlock: A deep learning approach to semantic data type detection" Proceedings of the 25th ACM SIGKDD International Conference on Knowledge Discovery & Data Mining, 2019, is an approach where only the values of a single column for a semantic type are considered. Accordingly, this conventional approach does ignore the context of all the other columns in the table. Zhang, Dan, et al. "Sato: Contextual Semantic Type Detection in Tables" arXiv preprint 1911.06311, 2019, describes an approach where both single column features and global table context features are considered. However, the extraction of these features does require case by case analysis and manual feature engineering.

SUMMARY

Accordingly, an aspect relates to provide a method and apparatus for generating automatically annotations for tabular cell data of a where the features can be learned from the raw data and therefore no manual feature engineering is required.

This is achieved by a computer-implemented method according to the first aspect of embodiments of the present invention.

Embodiments of the invention provide according to the first aspect a computer-implemented method for generating automatically annotations for tabular cell data of a table having columns and rows,
wherein the method comprises the steps of:
supplying raw cell data of cells of a row of the table as input to an embedding layer of a semantic type annotation neural network which transforms the received raw cell data of the cells of the supplied row into cell embedding vectors,
processing the cell embedding vectors generated by the embedding layer by a self-attention layer of the semantic type annotation neural network to calculate attentions among the cells of the respective row of said table encoding a context within said row output as cell context vectors and
processing the cell context vectors generated by the self-attention layer by a classification layer of the semantic type annotation neural network to predict semantic column type annotations and/or to predict relations between semantic column type annotations for the columns of said table.

The computer-implemented method according to embodiments of the present invention has the advantage that it does take into consideration the context of a certain entity occurrence in the table.

A further advantage of the computer-implemented method according to the first aspect of embodiments of the present invention is that in contrast to existing machine learning approaches which rely on hand-picked features the computer-implemented method according to embodiments of the present invention does not require any manual feature engineering.

With the computer-implemented method according to embodiments of the present invention, a self-attention model is used to encode context of each cell in a row of the table and then a classifier is used to predict semantic type annotations for each column of the table. Consequently, the computer-implemented method according to embodiments of the present invention is relatively simple to engineer and can be adapted to a wide range of use cases since it does not use any hand-crafted or hand-picked features.

In a possible embodiment of the computer-implemented method according to the first aspect of embodiments of the present invention, a bidirectional recurrent neural network is trained as an encoder of an autoencoder on cell embeddings provided by a byte-pair encoding model and is used as an encoder of the embedding layer of the semantic type annotation neural network.

In a further possible embodiment of the computer-implemented method according to the first aspect of embodiments of the present invention, the generated annotations of the tabular cell data of the table are supplied to an ETL process used to generate a knowledge graph instance stored in a memory.

In a still further possible embodiment of the computer-implemented method according to the first aspect of embodiments of the present invention, the classification layer calculates column type vectors comprising for the cell data of each cell of the respective supplied row predicted semantic column type probabilities.

In a further possible embodiment of the computer-implemented method according to the first aspect of embodiments of the present invention, a mean pooling of the column type vectors of all rows of the table is performed to predict a semantic column type for each column of said table.

In a still further possible embodiment of the computer-implemented method according to the first aspect of embodiments of the present invention, the self-attention layer of the semantic type annotation neural network comprises a stack of transformers to calculate attentions among the cells of the respective row of said table.

In a still further possible embodiment of the computer-implemented method according to the first aspect of embodiments of the present invention, the semantic type annotation neural network is trained in a supervised learning process using labeled rows as samples.

Embodiments of the invention provide according to the second aspect an annotation software tool adapted to perform the computer-implemented method according to the first aspect of the embodiments of present invention to generate automatically annotations for tabular cell data of a table received from a data source.

Embodiments of the invention provide according to the third aspect an apparatus used for automatic generation of annotations processed for providing a knowledge graph instance of a knowledge graph stored in a knowledge base, said apparatus comprising
  a semantic type annotation neural network having an embedding layer adapted to transform the received raw cell data of cells of a supplied row of a table into cell embedding vectors,
  a self-attention layer adapted to calculate attentions among the cells of the respective row of said table encoding a context within said row output as cell context vectors and having a classification layer adapted to process the cell context vectors received from the self-attention layer to predict semantic column type annotations and/or to predict relations between semantic column type annotations for the columns of said table.

In a still further possible embodiment of the apparatus according to the third aspect of embodiments of the present invention, the bidirectional recurrent neural network trained as an encoder of an autoencoder on cell embeddings provided by a byte-pair encoding model is implemented as an encoder of the embedding layer of the semantic type annotation neural network of said apparatus.

In a possible embodiment of the apparatus according to the third aspect of embodiments of the present invention, the generated annotations of the tabular cell data of the table are supplied to an ETL process used to generate a knowledge graph instance of the knowledge base.

In a further possible embodiment of the apparatus according to the third aspect of embodiments of the present invention, the classification layer of the semantic type annotation neural network is adapted to calculate column type vectors comprising for the cell data of each cell of the respective supplied row predicted semantic column type probabilities.

In a further possible embodiment of the apparatus according to the third aspect of embodiments of the present invention, a mean pooling of column type vectors of all rows of the table is performed to predict the semantic type annotation of each column of said table.

In a still further possible embodiment of the apparatus according to the third aspect of embodiments of the present invention, the self-attention layer of the semantic type annotation neural network comprises a stack of transformers adapted to calculate attentions among the cells of the respective row of said table.

In a further possible embodiment of the apparatus according to the third aspect of embodiments of the present invention, the semantic type annotation neural network of said apparatus is trained in a supervised learning process using labeled rows as samples.

BRIEF DESCRIPTION

Some of the embodiments will be described in detail, with reference to the following figures, wherein like designations denote like members, wherein:

FIG. 1 shows a flowchart of a possible exemplary embodiment of a computer-implemented method according to the first aspect of the present invention;

FIG. 2 shows a diagram for illustrating a possible exemplary embodiment of the apparatus according to a further aspect of the present invention.

DETAILED DESCRIPTION

Figure 3:
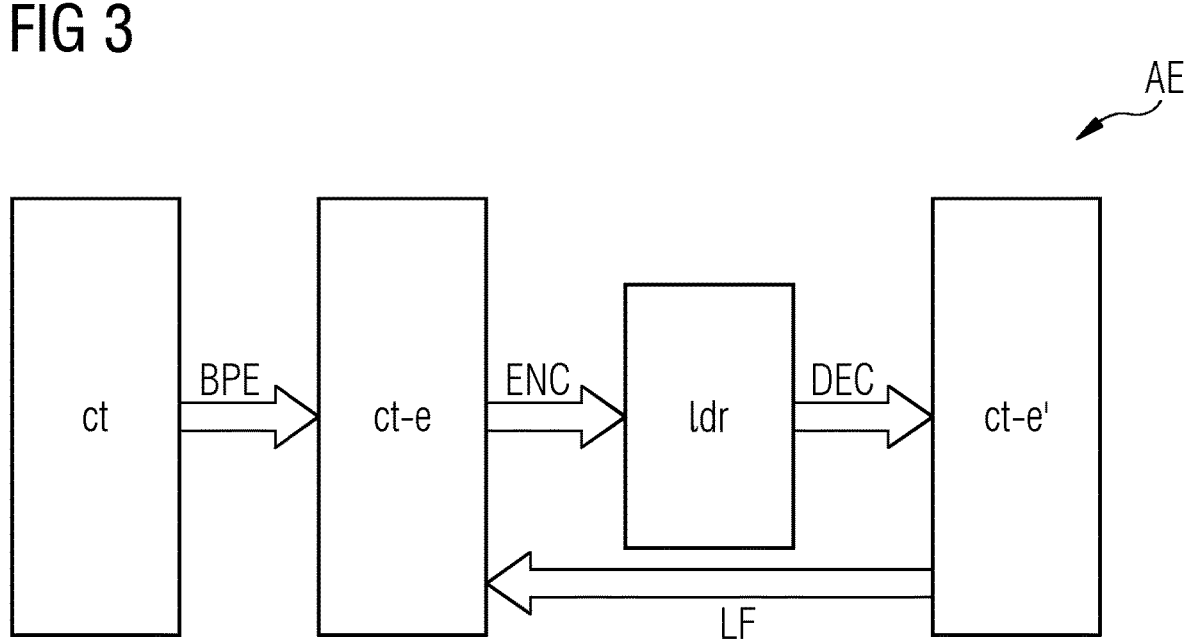
FIG. 3 shows a diagram for illustrating a training process used for training an encoder of an embedding layer of the semantic type annotation neural network used by the method and apparatus according to an embodiment of the present invention.

As can be seen from the flowchart illustrated in FIG. 1, the computer-implemented method according to the first aspect of embodiments of the present invention can comprise several main steps. In the illustrated exemplary embodiment, the computer-implemented method comprises three main steps S1, S2, S3. The computer-implemented method illustrated in FIG. 1 is provided for generating automatically annotations for tabular cell data of a table T having columns C and rows R.

In a first step S1 of the computer-implemented method, raw cell data of cells C of a row R within the table T is supplied as input to an embedding layer EL of a semantic type annotation neural network STANN which transforms the received raw cell data of the cells C of the supplied row R into cell embedding vectors e.

In a further step S2, the cell embedding vectors e generated by the embedding layer EL are processed by a self-attention layer SAL of the semantic type annotation neural network STANN to calculate attentions among the cells C of the respective row R of said table T encoding a context within said row R output as cell context vectors.

In a further step S3, the cell context vectors generated by the self-attention layer SAL are processed by a classification layer CL of the semantic type annotation neural network STANN to predict semantic column type annotations and/or to predict relations between semantic column type annotations for the columns C of the respective table T.

FIG. 2 shows the overall architecture of the semantic type annotation neural network STANN as used by the computer-implemented method illustrated in FIG. 1. As can be seen from the diagram of FIG. 2, the used semantic type annotation neural network STANN comprises an embedding layer EL, a self-attention layer SAL and a classification layer CL.

The embedding layer EL is adapted to transform the received raw cell data of cells C of a supplied row R of a table T into cell embedding vectors e. In the illustrated simple example of FIG. 2, the received input data comprises a row R having cell data of three different cells corresponding to columns in the table T including a first cell data "Munich", a second cell data "Germany" and a third cell data "1.46 million". A task of the computer-implemented method according to embodiments of the present invention resides in providing automatically corresponding semantic column type annotations for the different columns of the table T. In the very simple example of FIG. 2, these semantic column type annotations comprise the semantic type "City" for the first column, the semantic type "Country" for the second column and the identification that no semantic type could be found or generated for the cell data in the third column. With the computer-implemented method according to the first aspect of embodiments of the present invention, each cell or cell data for a given row R is first considered as an atomic unit. Then, self-attention is used to learn the context among the cells in the row R. The embedding layer EL of the semantic type annotation neural network STANN transforms each cell text of a cell C into a corresponding embedding vector e using a cell encoder. This cell encoder can be trained separately using an autoencoder structure as illustrated in FIG. 3.

The semantic type annotation neural network STANN as shown in FIG. 2 further comprises a self-attention layer SAL adapted to calculate attentions among the cells C of the respective row R of the table T encoding the context within said row R output as cell context vectors. The self-attention layer SAL is adapted to learn the context for semantic types for each cell C. The used self-attention mechanism SAM can be based on transformers as described by Vaswani, Ashish, et al. "Attention is all you need" Advances in neural information processing systems, 2017, to encode context in a sentence by computing attention among the tokens in the respective sentence. The self-attention layer SAL uses this approach to encode context in a row R by computing attention among the cells C in the respective row R. Transformers can also encode the order of the sequence of the tokens using a positional encoding method. In case that the order of the cells is not relevant, the transformers can be modified by removing the positional encoding.

The semantic type annotation neural network STANN as illustrated in FIG. 2 further comprises a classification layer CL. The classification layer CL is adapted to process the cell context vectors received from the self-attention layer SAL to predict semantic column type annotations and/or to predict relations between semantic column type annotations for the columns C of the respective table T.

The classification layer CL is adapted to learn the semantic type for each cell C. In a possible embodiment, a linear classifier can be used for this classification task. The task performed by the classification layer CL is similar to the task in a named entity recognition, NER, process where it is necessary to predict a type for each token in a sentence. Typically, the final classification in a NER model is done by a conditional random field model. The conditional random field model conditions on the order of the sequence of tokens. Further, with the computer-implemented method according to embodiments of the present invention, the order of the cells C in a row R of a table T in most cases has not to be considered and hence a linear layer can be used for the final classification task performed by the classification layer CL.

In a possible embodiment, to compute the column semantic types of the whole table T, all rows R of the table T can be passed through the semantic type annotation neural network STANN as illustrated in FIG. 2. Further, it is possible to compute and calculate a mean probability of all the semantic type prediction probabilities.

The semantic type annotation neural network STANN as depicted in FIG. 2 predicts only the semantic types that correspond to the different columns C of the table T. To predict further also the relations between the columns C, the same model with slight modification might be used. In that case, the embedding layer EL of the modified semantic type annotation neural network STANN used to predict also the relations between the different columns C of the table T can also include the cell position embeddings of the two cells C which are the subject and object of the relation in question. In this case, the classification is also slightly modified and performs a relation classification for the whole row R with two cells C of the row R highlighted as the subject and object of the respective relation.

As also illustrated in FIG. 3, a bidirectional recurrent neural network RNN can be trained as the encoder ENC of an autoencoder AE on cell embeddings provided by a byte-pair encoding model BPE. The trained bidirectional recurrent neural network RNN can then be used as an encoder within the embedding layer EL of the semantic type annotation neural network STANN as shown in FIG. 2. With the training, it is possible to embed a cell text ct in each training sample to provide cell text embedding cte using a pre-trained byte-pair encoding model as also described by Heinzerling, Benjamin, and Michael Strube "Bpemb: Tokenization-free pre-trained subword embeddings in 275 languages" arXiv preprint 1710.02187, 2017. The byte-pair encoding model BPE can segment words into subwords or tokens which effectively handles out-of-vocabulary words. In the next step, the encoder encodes the input embedding ct-e into a lower dimensional representation ldr. Then, the decoder DEC of the autoencoder AE learns to decode the lower dimensional representation ldr to the original embedding representation as close as possible, providing a reconstructed cell text embedding ct-e' feedback by a loss function LF. For the encoder ENC and decoder DEC of the autoencoder AE as illustrated in FIG. 3, it is possible to use bidirectional recurrent neural networks RNNs. The apparatus and method according to embodiments of the present invention does reuse the learned encoder ENC of the autoencoder AE as shown in FIG. 3 in the embedding layer EL of the semantic type annotation neural network STANN as shown in FIG. 2.

In a possible embodiment, the generated annotations of the tabular cell data of the table T can be supplied to an ETL process used to generate a knowledge graph instance stored in a memory.

As also illustrated in FIG. 2, the classification layer CL calculates column type vectors y comprising for the cell data of each cell C of the respective supplied row R predicted semantic column type probabilities. A mean pooling of the column type vectors y of all rows R of the table T can be performed to predict a semantic column type for each column C of the respective table T.

In an embodiment, the self-attention layer SAL of the semantic type annotation neural network STANN comprises a stack of transformers to calculate the attentions among the cells C of the respective row R of the table T. The semantic type annotation neural network STANN can be trained in a supervised learning process using labeled rows R as samples.

The computer-implemented method as shown in the flowchart of FIG. 1 can be used to a software tool used to generate automatically annotations for tabular cell data of a table T received from any kind of data source.

In contrast to conventional approaches, the computer-implemented method according to embodiments of the present invention does not rely on ontology alignment approaches. Accordingly, the computer-implemented method according to embodiments of the present invention is automatic and data-driven. Further, it does not require manually engineering features for different use cases. The computer-implemented method and apparatus according to embodiments of the present invention can learn the context for each semantic type from the raw data unlike to conventional approaches.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for generating automatically annotations for tabular cell data of a table, T, having columns, C, and rows, R,
   wherein the method comprises the steps of:
   supplying raw cell data of cells, C, of a row, R, of the table, T, as input to an embedding layer of a semantic type annotation neural network which transforms the received raw cell data of the cells, C, of the supplied row, R, into cell embedding vectors, e;
   processing the cell embedding vectors, e, generated by the embedding layer by a self-attention layer of the semantic type annotation neural network to calculate attentions among the cells, C, of the respective row, R, of the table, T, encoding a context within the row, R, output as cell context vectors; and
   processing the cell context vectors generated by the self-attention layer by a classification layer of the semantic type annotation neural network to predict semantic column type annotations and to predict relations between semantic column type annotations for the columns, C, of the table, T.

2. The computer-implemented method according to claim 1 wherein a bidirectional recurrent neural network, RNN, trained as an encoder of an autoencoder on cell embeddings provided by a byte-pair encoding model, BPE, is used as an encoder of the embedding layer of the semantic type annotation neural network.

3. The computer-implemented method according to claim 1 wherein the generated annotations and the tabular cell data of the table, T, are supplied to an extract, transform, load (ETL) process used to generate a knowledge graph instance stored in a memory.

4. The computer-implemented method according to claim 1 wherein the classification layer calculates column type vectors, y, comprising for the cell data of each cell, C, of the respective supplied row, R, predicted semantic column type probabilities.

5. The computer-implemented method according to claim 4 wherein a mean pooling of the column type vectors, y, of all rows, R, of the table, T, is performed to predict a semantic column type for each column, C, of the table, T.

6. The computer-implemented method according to claim 1 wherein the self-attention layer of the semantic type annotation neural network comprises a stack of transformers to calculate attentions among the cells, C, of the respective row, R, of the table, T.

7. The computer-implemented method according to claim 1 wherein the semantic type annotation neural network is trained in a supervised learning process using labeled rows, R, as samples.

8. A computer program product comprising a computer readable storage device have computer readable program code stored therein, the program code executable by a processor of a computer system to perform the computer-implemented method according to claim 1 to generate automatically annotations for tabular cell data received from a data source.

9. An apparatus used for automatic generation of annotations processed for providing a knowledge graph instance of a knowledge graph stored in a knowledge base, the apparatus comprising
   a processor, and
   a memory coupled to the processor, and having
   a semantic type annotation neural network having
   an embedding layer adapted to transform the received raw cell data of cells, C, of a supplied row, R, of a table, T, into cell embedding vectors, e,
   a self-attention layer adapted to calculate attentions among the cells, C, of the respective row, R, of the table, T, encoding a context within the row, R, output as cell context vectors, and
   a classification layer adapted to process the cell context vectors received from the self-attention layer to predict semantic column type annotations and to predict relations between semantic column type annotations for the columns, C, of the table, T.

10. The apparatus according to claim 9 wherein a bidirectional recurrent neural network, RNN, trained as an encoder of an autoencoder on cell embeddings provided by a byte-pair encoding model, BPE, is implemented as an encoder of the embedding layer of the semantic type annotation neural network of the apparatus.

11. The apparatus according to claim 9 wherein the generated annotations and the tabular cell data of the table, T, are supplied to an extract, transform, load (ETL) process used to generate a knowledge graph instance of the knowledge base.

12. The apparatus according to claim 9 wherein the classification layer of the semantic type annotation neural network is adapted to calculate column type vectors, y, comprising for the cell data of each cell, C, of the respective supplied row, R, predicted semantic column type probabilities.

13. The apparatus according to claim 9, wherein a mean pooling of column type vectors, y, of all rows, R, of the table, T, is performed to predict the semantic type annotation of each column, C, of the table, T.

14. The apparatus according to claim 9 wherein the self-attention layer of the semantic type annotation neural network comprises a stack of transformers adapted to calculate attentions among the cells, C, of the respective row, R, of the table, T.

15. The apparatus according to claim 9 wherein the semantic type annotation neural network of the apparatus is trained in a supervised learning process using labeled rows, R, as samples.

\* \* \* \* \*